United States Patent Office 3,394,181
Patented July 23, 1968

3,394,181
PHENOXY - LOWER - ALKYL - AMIDOXIMES AND PHENYLAMINO-LOWER-ALKYL-AMIDOXIMES
Malcolm R. Bell, East Greenbush, N.Y., assignor to Sterling Drug Inc., New York, N.Y., a corporation of Delaware
No Drawing. Filed June 29, 1964, Ser. No. 378,981
4 Claims. (Cl. 260—564)

This invention relates to the field of amidoximes, their acid-addition salts, and to methods for their preparation.

The compounds of the invention, in their free base form, are represented by the general formula:

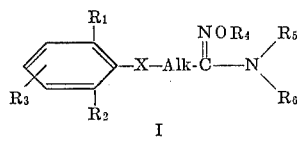

wherein $R_1$ and $R_2$ each independently represents a member selected from the group consisting of halogen (including fluorine, chlorine, bromine, and iodine), lower-alkyl, lower-alkoxy, lower-alkylmercapto, lower-alkylsulfinyl, lower-alkylsulfonyl, nitro, and trifluoromethyl; $R_3$ represents from one to three members selected from the group consisting of hydrogen, halogen (including fluorine, chlorine, bromine, and iodine), lower-alkyl, lower-alkoxy, lower-alkylmercapto, lower-alkylsulfinyl, lower-alkylsulfonyl, nitro, trifluoromethyl, methylenedioxy, hydroxy, benzyloxy, benzyl, isonitrosomethyl, or dilower-alkyl-aminomethyl; $R_4$ represents a member selected from the group consisting of hydrogen, lower-alkanoyl, benzoyl, lower-alkyl, and benzyl; $R_5$ represents a member selected from the group consisting of hydrogen, lower-alkyl, lower-alkanoyl, and hydroxy; $R_6$ represents a member selected from the group consisting of hydrogen and lower-alkyl; X represents a member selected from the group consisting of —O— and —NH—; and Alk represents a member selected from the group consisting of lower-alkylene containing from one to six carbon atoms and a cycloalkane ring containing from three to seven ring carbon atoms and having two free valences to which are attached the phenoxy and amidoxime groups.

In the above general Formula I, when $R_1$, $R_2$, or $R_3$ represent lower-alkyl, lower-alkoxy, lower-alkylmercapto, lower-alkylsulfinyl, or lower-alkylsulfonyl, or when $R_4$, $R_5$, or $R_6$ represent lower-alkyl, the lower-alkyl moiety can be straight or branched and can contain from one to about four carbon atoms. Thus, $R_1$, $R_2$, $R_3$, $R_4$, $R_5$, or $R_6$ represent, inter alia, methyl, ethyl, isopropyl, or n-butyl; or $R_1$, $R_2$, and $R_3$ represent, inter alia, methoxy, ethoxy, isopropoxy, n-butoxy, methylmercapto, ethylmercapto, n-butylmercapto, methylsulfinyl, ethylsulfinyl, n-butylsulfinyl, methylsulfonyl, ethylsulfonyl, or n-butylsulfonyl.

In the above general Formula I, when $R_3$ or $R_4$ represent benzyl, or when $R_4$ represents benzoyl, or when $R_3$ represents benzyloxy, the benzene rings thereof can be unsubstituted or can bear from one to three substituents of low molecular weight and of such nature that they do not interfere with or take part in the reaction. Examples of such substituents include halogen (including fluorine, chlorine, bromine, and iodine), lower-alkyl, lower-alkoxy, lower-alkylmercapto, lower-alkylsulfinyl, lower-alkylsulfonyl, trifluoromethyl, methylenedioxy, benzyloxy, and benzyl.

In the above general Formula I, when $R_4$ or $R_5$ represent lower-alkanoyl, they can be straight or branched and can contain from one to about four carbon atoms. Thus, $R_4$ and $R_5$ represent, inter alia, formyl, acetyl, propionyl, and isobutyryl.

In the above general Formula I, when Alk represents lower-alkylene, it can be straight or branched and can contain from one to six carbon atoms. The lower-alkylene group Alk thus stands, inter alia, for methylene, 1,2-ethylene, 2-methylethylene, 1,3-propylene, 2-methyl-1,4-butylene, 1,5-pentylene, and 1,6-hexylene.

In the above general Formula I, when Alk represents a cycloalkane ring containing from three to seven ring carbon atoms, it includes not only unsubstituted cycloalkane ring compounds, but also cycloalkane rings substituted by from one to three lower-alkyl groups where the lower-alkyl groups contain from one to four carbon atoms. Alk thus represents, inter alia, 1,2-cyclopropyl, 1,2-cyclobutyl, 1,3-cyclopentyl, 1,1-cyclopentyl, 1,2-cyclohexyl, 1,4-cyclohexyl, 1,2-cycloheptyl, 3-methyl-1,2-cyclopropyl, 2-methyl-1,2-cyclopropyl, 2-methyl-1,3-cyclopentyl, 3,5,6-trimethyl-1,2-cyclohexyl, and the like.

The compounds of Formula I where $R_4$, $R_5$, and $R_6$ are hydrogen are prepared by reacting a phenoxy-lower-alkanonitrile (or a phenoxy-cycloalkanonitrile) or a phenylamino - lower - alkanonitrile (or a phenylamino-cycloalkanonitrile) with hydroxylamine (suitably in the form of a hydrohalide salt) in an organic solvent inert under the conditions of the reaction and in the presence of a base, for example, alkali metal hydroxides, alkoxides, or carbonates. A preferred base is an alkali metal carbonate, for example potassium carbonate or sodium carbonate. Suitable organic solvents are methanol, ethanol, isopropanol, benzene, toluene, and the like. A preferred solvent is ethanol. The reaction is represented by the equation:

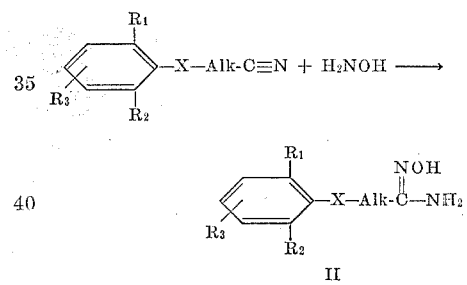

where $R_1$, $R_2$, $R_3$, Alk, and X have the meanings given above.

The phenoxy-lower-alkanonitriles (or phenoxy-cycloalkanonitriles) or phenylamino - lower - alkanonitriles (or phenylamino - cycloalkanonitriles) of Formula II required as intermediates in the above described procedure are prepared by several methods. One method involves the direct alkylation of an appropriately substituted phenol (X is —O—) or aniline (X is —NH—) with an appropriate halo - lower - alkanonitrile (or halo-cycloalkanonitrile). The reaction takes place either with or without the use of a solvent at temepratures in the range from 25° C. to about 160° C. and in the presence of an acid-acceptor, for example alkali metal hydrides, hydroxides, alkoxides, or carbonates. Suitable solvents are methanol, ethanol, isopropanol, acetone, benzene, toluene, dimethylformamide, or an excess of the halo-lower - alkanonitrile (or halo - cycloalkanonitrile).

A second method for the preparation of the phenoxy-lower - alkanonitriles or phenylamino - lower - alkanonitriles of Formula II in which the lower-alkylene group, Alk is 1,2-ethylene comprises reacting acrylonitrile with an appropriately substituted phenol (X is —O—) or aniline (X is —NH—). The reaction takes place at temperatures in the range from about 25° C. to about 80° C. and is preferably conducted in an excess of the acrylonitrile. The reaction generally takes place spontaneously on admixture of the reactants but may be facilitated by strongly basic catalyst, for example, potassium t-butoxide, sodium hydride, organo ammonium hydroxides, for example, benzyl trimethylammonium hydroxide, and the like.

The compounds of Formula I where $R_5$ is lower-alkyl and $R_6$ is hydrogen or where both $R_5$ and $R_6$ are lower-alkyl, are prepared by reacting a hydroxamic chloride derivative of Formula III below, wherein $R_1$, $R_2$, $R_3$, $R_4$, Alk, and X have the meanings given hereinabove, with a lower-alkylamine or a di - lower - alkylamine, $R_5R_6NH$. The compounds of Formula I where $R_5$ is hydroxy and $R_6$ is hydrogen or lower-alkyl are prepared by reacting a hydroxamic chloride derivative of Formula III below, wherein $R_1$, $R_2$, $R_3$, $R_4$, Alk, and X have the meanings given hereinabove, with hydroxylamine or an N-lower-alkylhydroxylamine $R_6NHOH$. These reactions are represented by the following equations:

where $R_1$, $R_2$, $R_3$, Alk, and X have the meanings given above.

The phenoxy - lower - alkylhydroxamic acid chlorides or phenylamino - lower - alkylhydroxamic acid chlorides (or corresponding cycloalkanylhydroxamic acid chlorides) of Formula III where $R_4$ is hydrogen are prepared by the reaction of chloride in chloroform with the corresponding aldoxime.

The compounds of Formula I where $R_4$ is lower-alkyl or benzyl are prepared by reacting the corresponding amidoxime, where $R_4$ is hydrogen, with an alkali metal hydride in a suitable organic solvent inert under the conditions of the reaction, for example, dimethylformamide, and reacting the resulting alkali metal salt with a lower-alkyl halide or a benzyl halide.

Alternatively, the alkali metal salt can be prepared by reacting the amidoxime with an alkali metal hydroxide in an aqueous or alcoholic medium, e.g., methanol,

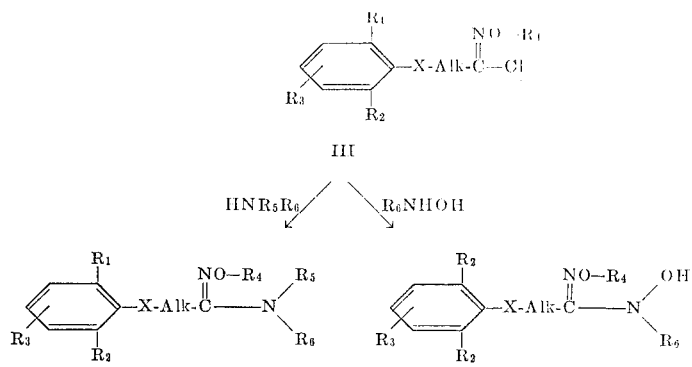

A preferred starting material of Formula III is one wherein $R_4$ is benzyl. The products can then be debenzylated with hydrogen over a suitable catalyst, for example palladium-on-charcoal or Raney nickel, to produce compounds of Formula I where $R_4$ is hydrogen.

The phenoxy - lower - alkylhydroxamic acid chloride-O - benzyl ethers (or phenoxy - cycloalkylhydroxamic acid chloride - O - benzyl ethers) or phenylamino-lower - alkylhydroxamic acid chloride - O - benzyl ethers (or phenylamino - cycloalkylhydroxamic acid chloride-O - benzyl ethers) of Formula III ($R_4$ is $C_6H_5CH_2$) are prepared by reacting the corresponding phenoxy - lower-alkano - amidoxime - O - benzyl ether or phenylamino-lower - alkanoamidoxime - O - benzyl ether (or corresponding cycloalkanoamidoxime) of Formula I, where $R_5$ and $R_6$ are hydrogen and $R_4$ is benzyl, with an alkali metal nitrite in the presence of hydrochloric acid under diazotization conditions. The reaction is represented by the following equation:

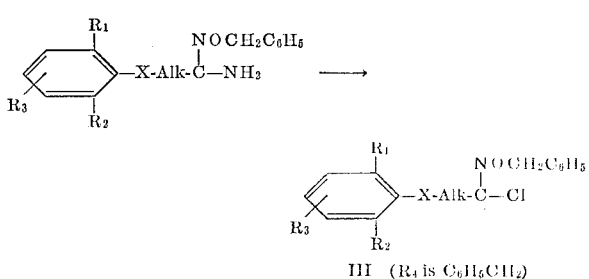

ethanol, or isopropanol. The reaction is represented by the equation:

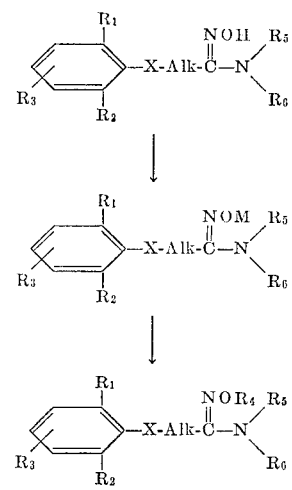

where $R_1$, $R_2$, $R_3$, $R_4$, $R_5$, $R_6$, X, and Alk have the meanings given above, except that $R_5$ is not hydroxy, and M represents an ion of an alkali metal.

The compounds of Formula I where $R_5$ is lower-alkanoyl are prepared by reacting the corresponding amidoxime ethers, where $R_4$ is lower-alkyl or benzyl and $R_5$ is hydrogen, with a lower-alkanoyl halide. When it is desired to prepare the compounds of Formula I where $R_5$ is lower-alkanoyl and $R_4$ is hydrogen, it is necessary to carry out the reaction with the lower-alkanoyl halide using the amidoxime-O-benzyl ether ($R_4$ is benzyl). Subsequent catalytic debenzylation affords the compounds where $R_4$ is hydrogen.

The compounds of Formula I*a* where $R_4$ is lower-alkanoyl or benzoyl and $R_5$ is hydrogen or lower alkyl are prepared by reacting the corresponding amidoxime with a lower-alkanoic anhydride or with benzoic anhydride, as the case may be, in the presence of a base such as pyridine. The reaction is preferably carried out in an excess of pyridine, as the solvent medium, and at a temperature in the range from about 0° C. to about 50° C.

The novel compounds of the instant invention are the bases of Formula I and the acid-addition salts of said bases, and the acid-addition salts are considered to be the full equivalents of the free bases. The compounds of the invention, in free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula I not only represents the structural configuration of the bases of my invention but is also representative of the structural entity which is common to all of my compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention then resides in the concept of the bases and cationic forms of the new amidoximes, amidines, and guanidines, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organic mono- and polysulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid-forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibinic acid, phenylphosphinous acid, methylphosphonic acid, phenylphosphinic acid, Amberlite ®XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I has demonstrated that they lower the blood pressure in dogs and rats thus indicating their usefulness as hypotensive agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrates specific embodiments of the invention without the latter being limited thereto.

PREPARATION OF INTERMEDIATES

Example 1

α-(2,6-dimethylphenoxy)acetonitrile [II: $R_1$ and $R_2$ are $CH_3$; $R_3$ is H; X is —O—; Alk is $CH_2$].—A mixture of 85 g. (0.69 mole) of 2,6-dimethylphenol, 96 g. (0.69 mole) of potassium carbonate and 120 ml. of methyl ethyl ketone was stirred and heated under reflux. A solution of 53.2 ml. (0.83 mole) of chloroacetonitrile in 50 ml. of methyl ethyl ketone was added over a period of one hour, and stirring and refluxing were continued for another hour. The bulk of the solvent was taken off in vacuo, the residue was diluted with water, extracted with ether, and the ether extracts were extracted with dilute sodium hydroxide. The organic solution was dried and taken to dryness thus affording the crude oily product which was distilled in vacuo giving 67 g. of α-2,6-dimethylphenoxy)acetonitrile, B.P. 80–85° C./0.1 mm.; $n_D^{25}=1.5151$.

Example 2

β-(2,6-dimethylphenoxy)propionitrile [II: $R_1$ and $R_2$ are $CH_3$; $R_3$ is H; X is —O—; Alk is $CH_2CH_2$].—A mixture of 122 g. (1.0 mole) of 2,6-dimethylphenol, 424 g. (8.0 moles) of acrylonitrile (and 13 ml. of 35 percent methanolic benzyl trimethylammonium hydroxide was heated under reflux for twenty-four hours, neutralized with dilute hydrochloric acid, concentrated in vacuo, and the residue shaken with hexane and 10 percent sodium hydroxide. The hexane solution, on concentration to dryness, gave 21 g. of a clear oil which was distilled in vacuo, the fraction boiling at 91.5° C./0.07 mm. being collected as product, thus giving 12.8 g. of β-(2,6-dimethylphenoxy)propionitrile, $n_D^{25}=1.5127$.

Example 3

γ-(2,6-dimethylphenoxy)butyronitrile [II: $R_1$ and $R_2$ are $CH_3$; $R_3$ is H; X is —O—; Alk is $(CH_2)_3$].—To a solution of 25.0 g. (0.205 mole) of 2,6-dimethylphenol in 250 ml. of dimethylformamide, was added 9.5 g. of a 51.7 percent dispersion of sodium hydride in mineral oil (4.92 g., 0.205 mole). When gas evolution had ceased, the solution was heated to boiling and treated while stirring with 36.5 g. (0.25 mole) of γ-bromobutyronitrile in 50 ml. of dimethylformamide over a period of over three and a half hours. The solution was heated under reflux for an additional three and a half hours, cooled to room temperature, taken to dryness in vacuo, triturated with water, and extracted with ethyl acetate. The ethyl acetate extracts were washed first with water, then with brine, dried over magnesium sulfate, and taken to dryness giving 43.3 g. of an oil. The latter was slurried with a total of 1.8 liters of hexane, and the combined hexane extracts were washed repeatedly with 10 percent sodium hydroxide, then with water and brine, and dried over magnesium sulfate, giving 28 g. of a pale yellow oil. The latter was purified by distillation in vacuo, the fraction boiling at 169–178° C./15 mm. being collected as product. There was thus obtained 18.0 g. of γ-(2,6-dimethylphenoxy)butyronitrile; $n_D^{25}=1.5015$.

Example 4

β-(2,6-dimethylphenylamino)propionitrile [II: $R_1$ and $R_2$ are $CH_3$; $R_4$ is H; X is —NH—; Alk is $CH_2CH_2$].—A mixture of 50 g. (0.412 mole) of 2,6-dimethylaniline, 44 g. (0.824 mole) of acrylonitrile, 5.0 g. of cupric acetate, and 1.0 g. of hydroquinone was stirred and heated under reflux for twenty-three hours. The cooled mixture was diluted with ether, filtered to remove a brown precipitate, and the filtrate extracted with dilute hydrochloric acid. The acid extracts were basified with 35 percent aqueous sodium hydroxide, extracted with ether, and the ether extracts washed with water, then with brine, dried over magnesium sulfate and taken to dryness giving 49.3 g. of an oil. The latter was distilled in vacuo, and the fraction boiling at 100–106° C./0.3 mm. was collected as product. There was thus obtained 37.3 g. of β-(2,6-dimethylphenylamino)propionitrile; $n_D^{55}=1.5427$.

Examples 5–21

By following the manipulative procedure described above in Example 1, substituting for the reactants used therein, an appropriate substituted phenol or aniline and an appropriate halo-lower-alkanonitrile or halo-cycloalkanonitrile, there can be obtained the compounds of Formula II listed below in Table 1.

TABLE 1

| Example: | $R_1$ | $R_2$ | $R_3$ | X | Alk |
|---|---|---|---|---|---|
| 5 | $CH_3$ | $CH_3$ | 3,4,5-tri-$CH_3$ | —O— | —$CH(CH_3)CH_2$— |
| 6 | Cl | Cl | 4-Cl | —O— | —$CH_2CH(CH_3)CH_2CH_2$— |
| 7 | Br | Br | 4-Br | —O— | —$(CH_2)_5$— |
| 8 | I | I | 4-I | —O— | —$(CH_2)_6$— |
| 9 | F | F | 4-F | —O— | 1,2-cyclopropyl. |
| 10 | $CH_3$ | $CH_3O$ | 3-$CH_3$ | —O— | 1-2-cyclobutyl. |
| 11 | $CH_3O$ | $CH_3O$ | 4-$CH_3O$ | —NH— | 1,3-cyclobutyl. |
| 12 | $CH_3S$ | $CH_3S$ | 4-$CH_3S$ | —NH— | 1,3-cyclopentyl. |
| 13 | $CH_3SO$ | $CH_3SO$ | 4-$CH_3SO$ | —NH— | 1,1-cyclopentyl. |
| 14 | $CH_3SO_2$ | $CH_3SO_2$ | 4-$CH_3SO_2$ | —NH— | 1,2-cyclohexyl. |
| 15 | $NO_2$ | $NO_2$ | 4-$NO_2$ | —O— | 1,4-cyclohexyl. |
| 16 | $CF_3$ | $CF_3$ | 4-$CF_3$ | —O— | 1,2-cycloheptyl. |
| 17 | $CH_3$ | $CH_3$ | 3-$OCH_2O$ | —O— | 3-methyl-1,2-cyclopropyl. |
| 18 | $CH_3$ | $CH_3$ | 4-$C_6H_5CH_2O$ | —NH— | 2-methyl-1,2-cyclopropyl. |
| 19 | $CH_3$ | $CH_3$ | 4-$C_6H_5CH_2$ | —O— | 2-methyl-1,3-cyclopentyl. |
| 20 | $CH_3$ | $CH_3$ | 4-CH=NOH | —O— | 3,5,6-trimethyl-1,2-cyclohexyl. |
| 21 | $CH_3$ | $CH_3$ | 4-$(C_2H_5)_2NCH_2$ | —O— | —$CH_2CH_2$— |

Example 22

α-(2,6-dimethylphenoxy)acetamidoxime [I: $R_1$ and $R_2$ are $CH_3$; $R_3$, $R_4$, $R_5$, and $R_6$ are H; X is —O—; Alk is $CH_2$].—A solution of 32.2 g. (0.20 mole) of α-(2,6-dimethylphenoxy)acetonitrile, 27.8 g. (0.40 mole) of hydroxylamine hydrochloride, and 63.6 g. (0.60 mole) of sodium carbonate in 500 ml. of 95 percent ethanol was stirred at room temperature for five days diluted with 500 ml. of absolute ethanol, filtered, and the filtrate taken to dryness in vacuo at 30–60° C. The residue, on trituration with water, crystallized. The latter was recrystallized from a hexane-pentane mixture giving 20 g. of α-(2,6-dimethylphenoxy)acetamidoxime, M.P. 72.6–74.6° C. (corr.).

α-(2,6-dimethylphenoxy)acetamidoxime, on subcutaneous administration in rats, was found to have an Average Effective (Hypotensive) Dose (AED$_{50}$) of 20 mg./kg. with no evidence of side effects.

Example 23

β-(2,6-dimethylphenoxy)propionamidoxime p-toluenesulfonate [I: $R_1$ and $R_2$ are $CH_3$; $R_3$, $R_4$, $R_5$, and $R_6$ are H; X is —O—; Alk is $CH_2CH_2$].—A mixture of 29 g. (0.17 mole) of β-(2,6-dimethylphenoxy)propionitrile, 23.0 g. (0.33 mole) of hydroxylamine hydrochloride and 75.5 g. (0.66 mole) of sodium carbonate in 500 ml. of 95 percent ethanol was stirred at room temperature for forty-four hours, filtered, and the residue washed with benzene. The filtrate was taken to dryness, and the residue was dissolved in ether and treated with a solution of 20.1 g. of p-toluenesulfonic acid monohydrate in ether. The solid which separated was collected and recrystallized twice from an acetone-ether mixture giving 15 g. of β-(2,6-dimethylphenoxy)propionamidoxime p-toluenesulfonate, M.P. 160.8–162.2° C.

with ethanolic hydrogen chloride, and the solid which separated was collected and recrystallized from methanol giving 11.1 g. of β-(2,6-dimethylphenylamino)propionamidoxime dihydrochloride, M.P. 204.0–205.2° C. (corr.).

β-(2,6-dimethylphenylamino)propionamidoxime dihydrochloride, on subcutaneous administration in the renal hypertensive rat, was shown to have an Average Effective (Hypotensive) Dose ($AED_{50}$) of 20 mg./kg.

Examples 26–42

By following the manipulative procedure described above in Example 22, substituting for the α-(2,6-dimethylphenoxy)acetonitrile used therein, the nitriles described above in Examples 5–21, there can be obtained the respective compounds of Formula I listed below in Table 2 where $R_4$, $R_5$, and $R_6$ in each case are H.

TABLE 2

| Example: | $R_1$ | $R_2$ | $R_3$ | X | Alk |
|---|---|---|---|---|---|
| 26 | $CH_3$ | $CH_3$ | 3,4,5-tri-$CH_3$ | —O— | —$CH(CH_3)CH_2$— |
| 27 | Cl | Cl | 4-Cl | —O— | —$CH_2CH(CH_3)CH_2CH_2$— |
| 28 | Br | Br | 4-Br | —O— | —$(CH_2)_5$— |
| 29 | I | I | 4-I | —O— | —$(CH_2)_6$— |
| 30 | F | F | 4-F | —O— | 1,2-cyclopropyl. |
| 31 | $CH_3$ | $CH_3O$ | 3-$CH_3$ | —O— | 1,2-cyclobutyl. |
| 32 | $CH_3O$ | $CH_3O$ | 4-$CH_3O$ | —NH— | 1,3-cyclobutyl. |
| 33 | $CH_3S$ | $CH_3S$ | 4-$CH_3S$ | —NH— | 1,3-cyclopentyl. |
| 34 | $CH_3SO$ | $CH_3SO$ | 4-$CH_3SO$ | —NH— | 1,1-cyclopentyl. |
| 35 | $CH_3SO_2$ | $CH_3SO_2$ | 4-$CH_3SO_2$ | —NH— | 1,2-cyclohexyl. |
| 36 | $NO_2$ | $NO_2$ | 4-$NO_2$ | —O— | 1,4-cyclohexyl. |
| 37 | $CF_3$ | $CF_3$ | 4-$CF_3$ | —O— | 1,2-cycloheptyl. |
| 38 | $CH_3$ | $CH_3$ | 3-$OCH_2O$ | —O— | 3-methyl-1,2-cyclopropyl. |
| 39 | $CH_3$ | $CH_3$ | 4-$C_6H_5CH_2O$ | —NH— | 2-methyl-1,2-cyclopropyl. |
| 40 | $CH_3$ | $CH_3$ | 4-$C_6H_5CH_2$ | —O— | 2-methyl-1,3-cyclopentyl. |
| 41 | $CH_3$ | $CH_3$ | 4-CH=NOH | —O— | 3,5,6-trimethyl-1,2-cyclohexyl. |
| 42 | $CH_3$ | $CH_3$ | 4-$(C_2H_5)_2NCH_2$ | —O— | —$CH_2CH_2$— |

β-(2,6-dimethylphenoxy)propionamidoxime p-toluenesulfonate, on subcutaneous administration in rats, was found to have an Average Effective (Hypotensive) Dose ($AED_{50}$) of 10 mg./kg. with no evidence of side effects. At oral doses from 1.0 to 4.0 mg./kg. in dogs, it produced an effective sustained lowering in blood pressure with no side effects.

Example 24

γ-(2,6-dimethylphenoxy)butyramidoxime hydrochloride [I: $R_1$ and $R_2$ are $CH_3$; $R_3$, $R_4$, $R_5$, and $R_6$ are H; X is —O—; Alk is $(CH_2)_3$].—A mixture of 36 g. (0.19 mole) of γ-(2,6-dimethylphenoxy)butyronitrile, 26.4 g. (0.38 mole) of hydroxylamine hydrochloride and 45.4 g. (0.42 mole) of anhydrous sodium carbonate in 3.6 liters of 95 percent ethanol was heated under reflux with stirring for about eight hours. The mixture was taken to dryness in vacuo, the residue was suspended in ethyl acetate and water, and the mixture was extracted with ethyl acetate. The combined organic extracts were washed with water, then with brine, dried over magnesium sulfate and taken to dryness giving 36 g. of a cloudy oil. The latter was dissolved in ethanol, treated with a molar excess of ethanolic hydrogen chloride and taken to dryness. The residue was recrystallized from acetone giving 28.8 g. of γ-(2,6-dimethylphenoxy)butyramidoxime hydrochloride, M.P. 145.8–151.0° C. (corr.).

Example 25

β-(2,6-dimethylphenylamino)propionamidoxime dihydrochloride [I: $R_1$ and $R_2$ are $CH_3$; $R_3$, $R_4$, $R_5$, and $R_6$ are H; X is NH; Alk is $CH_2CH_2$].—A mixture of 34 g. (0.20 mole) of β-(2,6-dimethylphenylamino)propionitrile, 27 g. (0.39 mole) of hydroxylamine hydrochloride and 46 g. (0.43 mole) of anhydrous sodium carbonate in 3.4 liters of 95 percent ethanol was heated with stirring under reflux for approximately thirteen hours, taken to dryness, and the residue suspended in a water-ethyl acetate mixture. The aqueous suspension was extracted with ethyl acetate, and the combined organic extracts were washed first with water, then with brine, dried over magnesium sulfate and taken to dryness. The residual light orange oil (36.0 g.) was taken into ethanol, treated

Example 43

β-(2,6-dimethylphenoxy)propionamidoxime-O-acetate [I: $R_1$ and $R_2$ are $CH_3$; $R_3$, $R_5$, and $R_6$ are H; $R_4$ is $CH_3CO$; X is —O—; Alk is $CH_2CH_2$].—By reacting β-2,6-dimethylphenoxy)propionamidoxime with acetic anhydride in the presence of pyridine, there can be obtained β-(2,6-dimethylphenoxy)propionamidoxime-O-acetate.

Example 44

β-(2,6-dimethylphenoxy)propionamidoxime-O-benzoate [I: $R_1$ and $R_2$ are $CH_3$; $R_3$, $R_5$, and $R_6$ are H; $R_4$ is $C_6H_5CO$; X is —O—; Alk is $CH_2CH_2$].—By reacting β-(2,6-dimethylphenoxy)propionamidoxime with benzoyl chloride in the presence of pyridine, there can be obtained β-(2,6-dimethylphenoxy)propionamidoxime-O-benzoate.

By replacing the benzoyl chloride in the foregoing preparation by 4-toluyl chloride, 4-chlorobenzoyl chloride, or 3-methoxybenzoyl chloride, there can be obtained the corresponding -O-(4-toluate), -O-(4-chlorobenzoate), or -O-(3-methoxy benzoate), respectively, of β-(2,6-dimethylphenoxy)propionamidoxime.

Example 45

β-(2,6-dimethylphenoxy)propionamidoxime-O-benzyl ether [I: $R_1$ and $R_2$ are $CH_3$; $R_3$, $R_5$, and $R_6$ are H; $R_4$ is $C_6H_5CH_2$; X is —O—; Alk is $CH_2CH_2$].—By reacting β-(2,6-dimethylphenoxy)propionamidoxime with benzyl chloride, 4-methylmercaptobenzyl chloride, 4-methylsulfonylbenzyl chloride, or 4-trifluoromethylbenzyl chloride in the presence of sodium hydroxide, there can be obtained, respectively, β-(2,6-dimethylphenoxy)propionamidoxime-O-benzyl ether, -O-(4-methylmercaptobenzyl) ether, -O-(4-methylsulfonylbenzyl) ether, or -O-(4-trifluoromethylbenzyl) ether.

Example 46

β-(2,6-dimethylphenoxy)propionamidoxime-O-methyl ether [I: $R_1$, $R_2$, and $R_4$ are $CH_3$; $R_3$, $R_5$, and $R_6$ are H; X is —O—; Alk is $CH_2CH_2$].—By reacting β-(2,6-dimethylphenoxy)propionamidoxime with methyl iodide in the presence of sodium hydroxide, there can be obtained β - (2,6 - dimethylphenoxy)propionamidoxime-O-methyl ether.

Example 47

β-(2,6-dimethylphenoxy)-N,N-diethylpropionamidoxime [I: $R_1$ and $R_2$ are $CH_3$; $R_3$ and $R_4$ are H; $R_5$ and $R_6$ are $C_2H_5$; X is —O—; Alk is $CH_2CH_2$].—By reacting the β - (2,6 - dimethylphenoxy)propionamidoxime-O-benzyl ether described above in Example 45 with sodium nitrate in the presence of hydrochloric acid at a temperature from about 0° C. to 5° C., there can be obtained β-(2,6-dimethylphenoxy)-propionohydroxamic chloride-O-benzyl ether. By reacting the latter with diethylamine, there can be obtained β-(2,6-dimethylphenoxy)-N,N-diethylpropionamidoxime-O-benzyl ether.

By reducing the latter with hydrogen over a palladium-on-charcoal catalyst, there can be obtained β-(2,6-dimethylphenoxy)-N,N-diethylpropionamidoxime.

Example 48

β-(2,6-dimethylphenoxy)propionohydroxamic acid oxime [I: $R_1$ and $R_2$ are $CH_3$; $R_3$, $R_4$, and $R_6$ are H; $R_5$ is OH; X is —O—; Alk is $CH_2CH_2$].—By reacting the β-(2,6-dimethylphenoxy)propionohydroxamic chloride-O-benzyl ether described above in Example 47 with hydroxylamine, there can be obtained β - (2,6 - dimethylphenoxy) - N - hydroxypropionamidoxime-O-benzyl ether. By reducing the latter with hydrogen over a palladium-on-charcoal catalyst, there can be obtained β-(2,6-dimethylphenoxy)propionohydroxamic acid oxime.

Example 49

β - (2,6-dimethylphenoxy)-N-acetylpropionamidoxime-O-acetate [I: $R_1$ and $R_2$ are $CH_3$: $R_3$ and $R_6$ are H; $R_4$ and $R_5$ are $CH_3CO$; X is —O—; Alk is $CH_2CH_2$].—By reacting β-(2,6-dimethylphenoxy)propionamidoxime with acetic anhydride in the presence of pyridine, using the manipulative procedure described above in Example 43, there can be obtained β-2,6-dimethylphenoxy)-N-acetylpropionamidoxime-O-acetate.

I claim:
1. A compound of the formula:

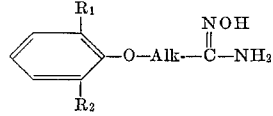

wherein $R_1$ and $R_2$ each independently represents lower-alkyl and Alk represents $CH_2CH_2$.

2. A compound of the formula:

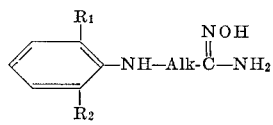

wherein $R_1$ and $R_2$ each independently represents lower-alkyl and Alk represents lower-alkylene containing from one to six carbon atoms.

3. β-(2,6-dimethylphenoxy)propionamidoxime.
4. β-(2,6-dimethylphenylamino)propionamidoxime.

References Cited
UNITED STATES PATENTS

| | | |
|---|---|---|
| 2,947,782 | 8/1960 | deBenneville et al. 260—564 XR |
| 3,016,382 | 8/1962 | Wright et al. |
| 3,139,455 | 6/1964 | Campbell _____ 260—564 |
| 3,144,485 | 8/1964 | Bene et al. _____ 260—564 |
| 3,234,255 | 2/1966 | Hackmann et al. __ 260—564 XR |

CHARLES B. PARKER, *Primary Examiner.*

ROBERT V. HINES, *Assistant Examiner.*

UNITED STATES PATENT OFFICE
CERTIFICATE OF CORRECTION

Patent No. 3,394,181                                         July 23, 1968

Malcolm R. Bell

It is certified that error appears in the above identified patent and that said Letters Patent are hereby corrected as shown below:

Column 2, line 56, "temepratures" should read -- temperatures --. Column 3, lines 64 to 75, the formula should appear as shown below:

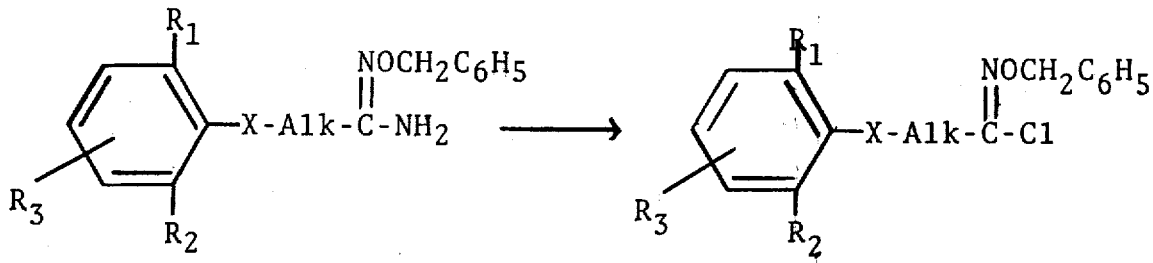

Column 4, line 7, "chloride" should read -- chlorine --. Column 7, line 11, "illustrates" should read -- illustrate --; line 30, "α-2,6-" should read -- α-(2,6- --. Column 8, line 33, "$n_D^{55}$" should read -- $n_D^{25}$ --. Column 10, lines 38 and 39, "β-2,6-" should read -- β-(2,6- --. Column 11, line 8, "nitrate" should read -- nitrite --. Column 12, line 1, "β-2,6-" should read -- β-(2,6- --.

Signed and sealed this 16th day of December 1969.

(SEAL)
Attest:

EDWARD M. FLETCHER, JR.                      WILLIAM E. SCHUYLER, JR.
Attesting Officer                                  Commissioner of Patents